United States Patent [19]

Smith

[11] 4,081,379

[45] Mar. 28, 1978

[54] FILTER BAG ARRANGEMENT FOR A PRESSURE VESSEL AND METHOD OF MANUFACTURE THEREOF

[75] Inventor: Edward A. Smith, Greenwich, Conn.

[73] Assignee: Advanced Filtration Equipment Corporation, Stamford, Conn.

[21] Appl. No.: 736,465

[22] Filed: Oct. 28, 1976

[51] Int. Cl.² .......................................... B01D 29/06
[52] U.S. Cl. .................................. 210/232; 210/315;
210/342; 210/444; 210/455
[58] Field of Search ............... 210/232, 315, 317, 342,
210/444, 455, 474, 476, 484, 443

[56] References Cited

U.S. PATENT DOCUMENTS

| 1,633,818 | 6/1927 | Kogstrom | 210/444 |
|---|---|---|---|
| 1,647,799 | 11/1927 | Hammer | 210/342 |
| 1,762,224 | 6/1930 | Guthmann et al. | 210/444 |
| 2,093,877 | 9/1937 | Von Pentz | 210/484 |
| 2,387,368 | 10/1945 | Vokes | 210/443 X |
| 3,050,189 | 8/1962 | Williams | 210/232 |
| 3,486,626 | 12/1969 | Close | 210/232 |

Primary Examiner—Charles N. Hart
Assistant Examiner—Richard W. Burks
Attorney, Agent, or Firm—Alfred E. Miller

[57] ABSTRACT

A filter bag pressure vessel having a filter bag that affords significantly more filter area than the conventional filter bag per equal unit area of volume displacement. The arrangement incorporates a center feed that permits a positive 360° sealing of the inlet and filter bag between two parallel surfaces with a single sealing means that eliminates close tolerances and other requirements that were utilized in the prior art constructions. In addition, the filter bag and supporting structure can be adapted to fit within existing pressure vessels.

9 Claims, 15 Drawing Figures

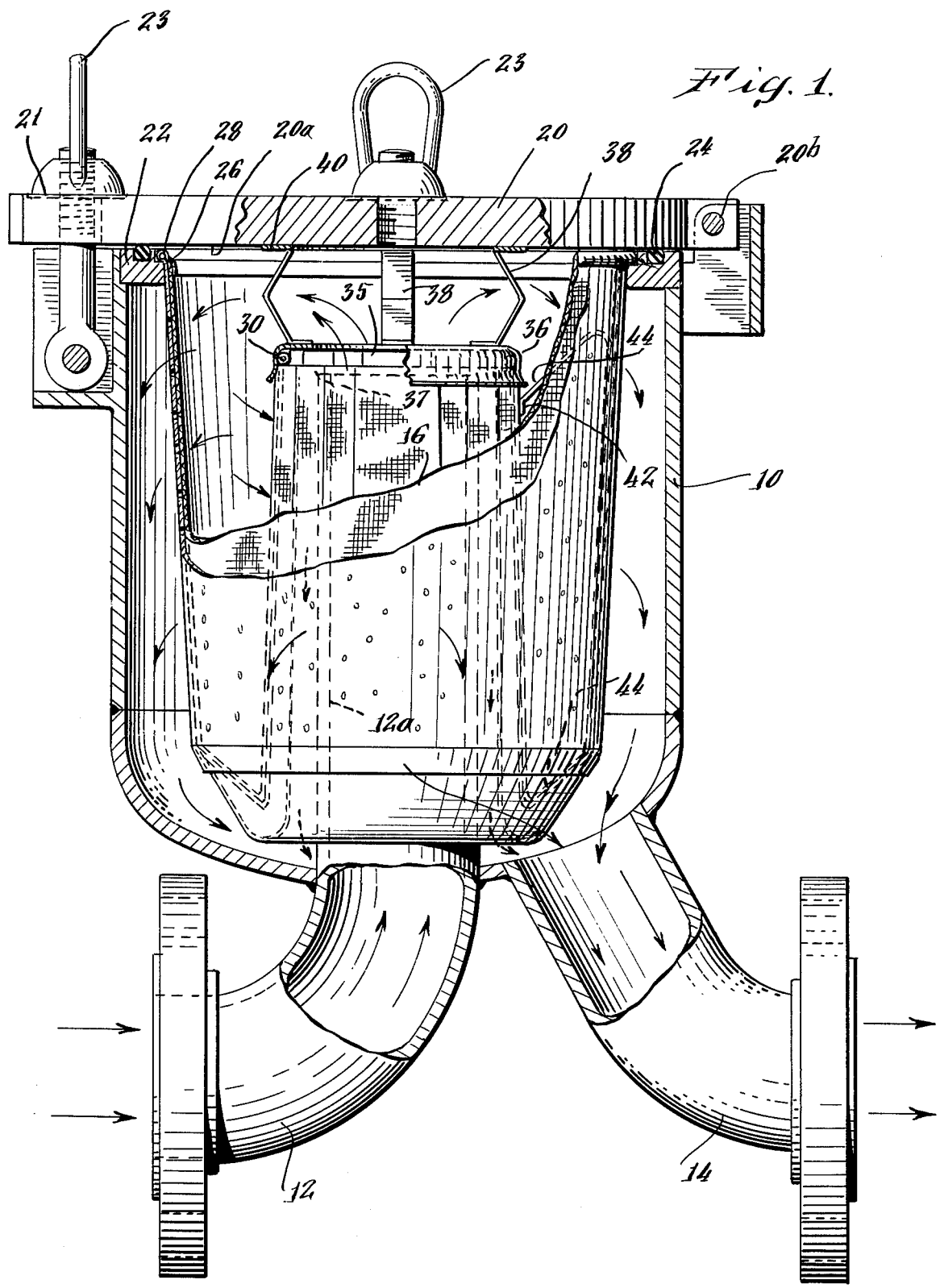

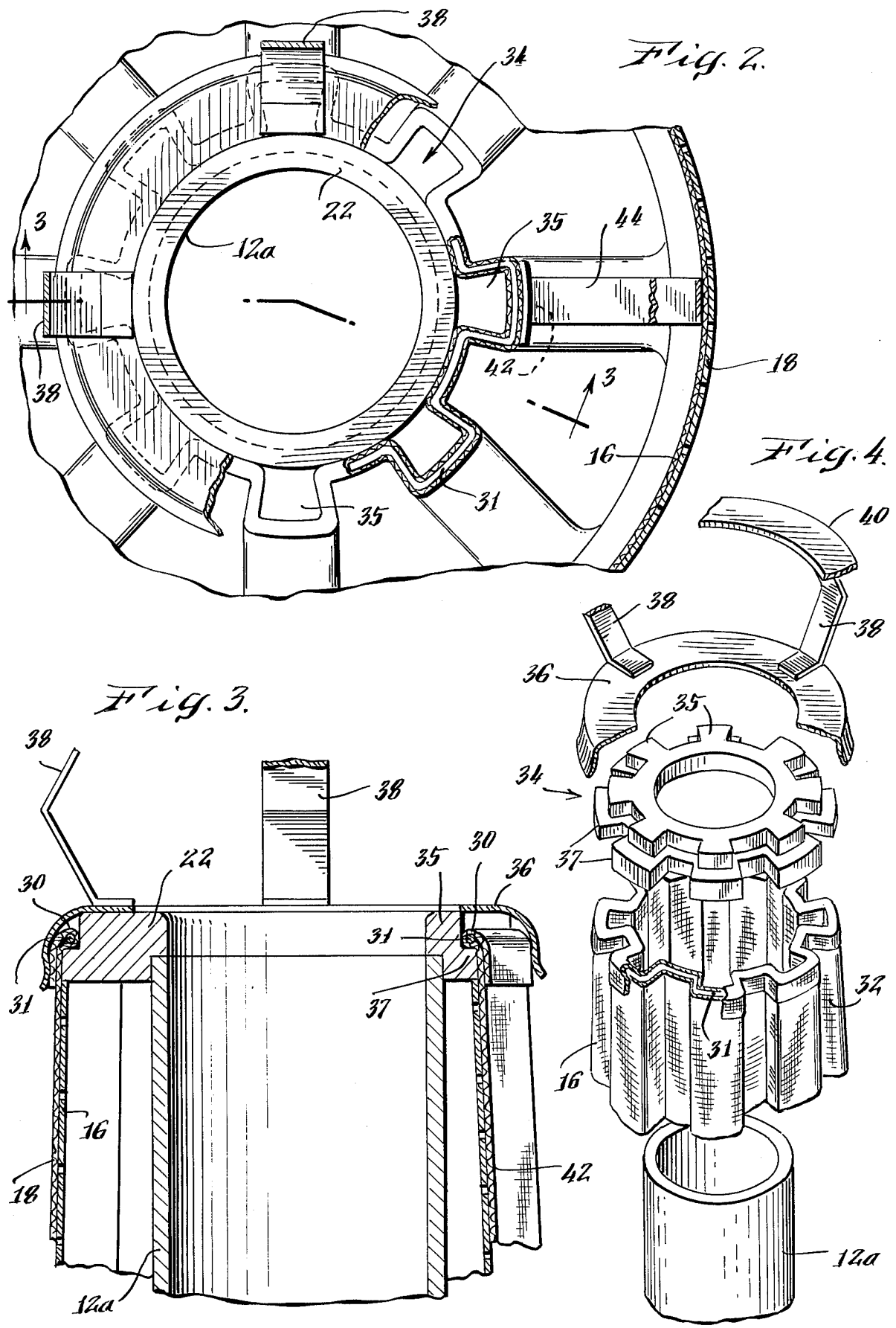

FILTER BAG ARRANGEMENT FOR A PRESSURE VESSEL AND METHOD OF MANUFACTURE THEREOF

BACKGROUND OF THE INVENTION

Pressure vessels with bag filters are known. These vessels are for filtration of a liquid present in the system. All of these systems employ an external piping arrangement. In one example of a prior art, bag filter pressure vessel is a construction in which the inlet pipe must be detached in order to enter the pressure vessel. In this arrangement, a special elastomer seal is used in the form of a C which seals both the filter bag and the back-up restrainer basket's upper lip which must be inserted into the seal prior to the start up of the pressure vessel. Thereafter, as pressure is increased due to the filtration process the forces built up by the prevailing pressure enter the inner portions of the C seal to thereby expand the seal. The aforesaid construction and arrangement results in a positive force being applied to both the cover portion and the top of the vessel for a positive seal of the vessel to the atmosphere. Therefore, it must be apparent that the greater the internal pressure buildup within the pressure vessel the greater the sealing forces. However, the C-type seal is so constructed that with the greater pressure buildup, the C-type seal is expanded, and consequently the lesser the force applied on the ring portion of the filter bag which is located within the C-type seal. It should be evident, therefore, that the present arrangement always has the potential of bypassing the filter with undesirable dirt particles. Furthermore, it should be pointed out that once the filter bag is used or spent, the contaminated C-type seal, as well as the filter bag and the retainer basket, must all be physically handled and removed from the apparatus. In this particular arrangement, the unclean C-type seal must be stretched off the bag and the basket, and cleaned for reuse. Thereafter, the bag is disposed of and the retainer basket cleaned. Furthermore, all elements and members of this arrangement must be reassembled in order to render the pressure vessel ready for use again.

A second type of bag filter which is employed in a pressure vessel is provided with an elaborate hinge arrangement. In this construction a seal is inserted in a raised machined groove which is located laterally outside of the body of the vessel in order to provide a sealing area for the inlet piping. The pressure vessel is provided with a flat ring about the top of the body on the vessel and with a tab extension on the ring at the rear of the vessel.

In addition, a flat cover provided with an outer peripheral dimension, which is approximately the same as the flat ring, is affixed to the pressure vessel. The clamping action as a result of this securement squeezes the flat cover on the top and bottom side seals of the basket flange and on the inlet seal to create a sufficient pressure so that the system is hopefully adequately sealed. However, because of the construction and arrangement of the bag filter construction, it is difficult to get a positive, effective sealing of the vessel.

Another proposed arrangement for a pressure vessel bag filter relates to a construction in which the inlet feed is located below the level of the top of the filter bag and therefore a narrow, deep cavity is formed which receives the incoming liquid. The liquid spills over into the filter bag. Furthermore, a bevelled seat for the retainer basket is used, however if only a slight amount of differential downward force is applied to a part of the bag's ring, the bag may be shifted and unseated. Because of the difficulty in achieving a positive seal in this particular construction, a situation may arise in which by-passing of the filter bag results. When this happens, the contamination bypasses the filter and enters the downstream side of the pressure vessel thereby rendering the filtering media of the vessel much less effective.

Furthermore, the inlet cavity, as stated hereinbefore, is rather deep and narrow and cannot be effectively cleaned. Therefore, the hazard of recontamination of the pressure vessel is potentially present. This is especially true if the residue is not compatible with the next recycling of the filter.

Another filter construction that has been used in the past is an arrangement in which an inlet in the side wall of the pressure vessel is above the mouth opening of the filter bag. This arrangement can result in poor filtration since one of the principal features of the filter bag filtration is to not contaminate the downstream side of the filter, even after the filter has been spent or used. Thus, the retrieval of the spent filter bag permits the residual contaminant to spill over into the downstream side of the vessel thereby causing an unnecessary cleanup of the pressure vessel.

However, in spite of the drawbacks associated with the well-known pressure vessels having bag filters as set forth above, there are many obvious advantages of the filter bag concept of filtration over other methods of filtering. These advantages include: containing the contaminate in the filter bag for rapid disposal; a minimum of filtering liquid retained in the spent filter medium; a minimum cleanup of the vessel; prevention of contaminant downstream during the changeover or removal of the filter media; and minimizing the downtime necessary for changeover to insert the second filter. Moreover, in spite of the sealing problems in the inlet piping of the bag filters, as well as the problems in connection with sealing the filter bag against bypassing which are present in the above known constructions, the present invention overcomes these disadvantages and presents a novel and unique bag filter for a pressure vessel which operates efficiently and reliably.

SUMMARY OF THE INVENTION

It is an object of the present invention to provide a filter bag and pressure vessel in which the bag significantly increases the filter area over the useable area of conventional filter bags.

It is another object of the present invention to use a novel pressure vessel and filter bag arrangement in an in-line piping system.

A further object of the present invention is to provide a pressure vessel with a bag filter in which the inlet pipe is center fed, and which comes directly up through the center of the pressure vessel itself in a standpipe manner. The discharge or outlet pipe exits from the bottom of the pressure vessel in an off-center location.

It is another object of the present invention to provide a filter bag having two rings of different diameters. The outer ring is affixed to the top of the body of the vessel while the inner ring is seated within the outer ring and generally on a plane below the outer ring to form an annular shaped filter bag that is continuous from the outer to the inner ring. The particular shape of the annular filter bag yields considerably more available surface area than the conventional type filter bag occupying the same volume. It is within the scope of the present invention to utilize a number of geometric configurations which extends the surface area of the filter medium. However, the preferred configuration is a fluted or cogged arrangement rendering the most area for the filter with the least number of flutes or cogs.

It is a further object of the present invention to provide a new method or process for affixing the filter material to the structure of the pressure vessel. According to this method, the filter material is attached within a pressure vessel and a particular type of tool is inserted to shape the filter medium about a fluted or cogged configuration.

It is still another object of the present invention to use filter bag retainers or baskets of existing structures and insert the present extended area filter media therein to increase the capacity or life of the existing equipment by means of the use of the annular-shaped filter bag that is continuous from the outer to the inner ring.

Another object of the present invention is to provide a center feed port to the pressure vessel which allows positive 360° sealing of the inlet, as well as the filter bag being positioned between two parallel surfaces with a single sealing arrangement. This construction and arrangement eliminates close tolerances as well as extraneous influences, such as misaligned plumbing connections, both of which are disadvantages of known filter bag pressure vessel constructions.

In order that the invention will be more clearly understood, it will now be disclosed in greater detail with reference to the accompanying drawings, in which:

FIG. 1 is a side elevational view, partly in section, of a center feed filter pressure vessel with the inlet and outlet pipes being in an in-line arrangement, the assembly being constructed in accordance with the teachings of my invention;

FIG. 2 is a partial top plan view of the structure shown in FIG. 1 with parts thereof broken away for purposes of clarity;

FIG. 3 is a sectional view taken along the lines 3—3 of FIG. 2;

FIG. 4 is an exploded view, partly broken away, which shows the assembly which illustrates the cogged construction, with the filter media attached, and fitting over and rigidly secured to the center feed pipe;

DESCRIPTION OF THE PREFERRED EMBODIMENTS

Figure 5:
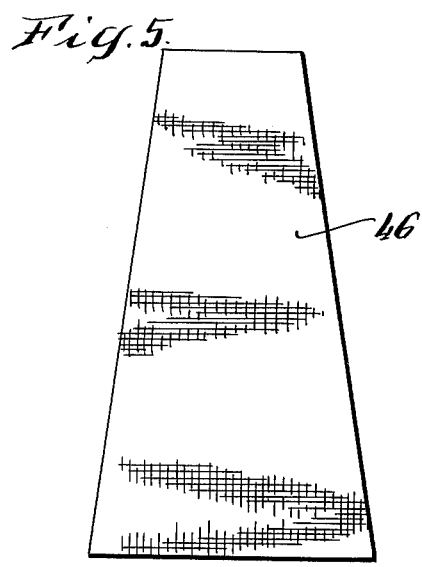
FIGS. 5, 6 and 7 show one method of making an annular filter bag in accordance with the teachings of the present invention, having a V—V configuration.

Referring to FIG. 1, an arrangement is shown comprising a pressure vessel 10 that is mounted in the path of flow of liquid from inlet pipe 12 to outlet pipe 14 that are arranged in-line. The inlet pipe 12 is provided with an upstanding portion forming the center feed conduit 12a. It should be noted that the center feed conduit 12a is located in the geometric center of the pressure vessel 10, however it is within the teachings and scope of the present invention to have conduit 12a enter the pressure vessel 10 through the side thereof while the upper portion thereof is bent at right angles thereto, to thereby be centrally located within the vessel 10. In the aforesaid alternate construction (not shown), the discharge pipe may exit through the bottom of the vessel for ease of drainage. However, as shown in FIG. 1, the discharge pipe 14 exits from the pressure vessel at a location in the bottom thereof which is off the center of the vessel. An annular-shaped filter bag 16 is symmetrically arranged about the center feed conduit 12a and is provided with a perforated retainer basket member 18 that functions as a supporting back-up structure for the filter bag 16 when liquid flows through the pressure vessel. The construction for securing the annular filter 16 in position within the pressure vessel 10 will be fully explained hereinafter.

The pressure vessel 10 is provided with a pivotal retainer plate 20 which closes off the open top of the vessel. The plate 20 also has a hold-down assembly 21 that can be loosened and swung away from the plate so that the latter may be pivoted upwardly about the pivot point 20b for ease of removal of the filter bag 16. An outer retainer ring 22 is shown secured to the upper inner circumferential surface of the pressure vessel 10, and provided with an annular sealing ring 24. The ring 22 further has a seat 26 for accommodating the filter bag outer mouth 28. A screw member 23 is shown in the retainer plate 20 which, when tightened, will force the plate 20 down on the annular ring 24 to provide a tight 360° seal against leakage of the liquid passing through the pressure vessel 10. It should be observed that the filter bag 16 is provided with an inner mouth 30 that is shown in a cogged or castellated configuration in FIGS. 2 and 4. The inner mouth 30 is stiffened as a result of the use of a semi-rigid wire ring 31 or other suitable material which can be formed into a cog configuration, or by the use of self-welting material on the peripheral edge of the inner mouth 30. The inner mouth 30 is held on the upper end of cogged element 32 that is preferably fitted on and surrounds the center feed conduit 12a by means of a pressure friction fit. The inner mouth 30 is maintained in position by means of a bi-level cog 34 having an upper smaller ring 35 and a lower larger ring 37. The inner mouth 30 of the filter bag is pulled over the lower larger ring 37 of the cog 34. Thereafter, an annular cap 36 is forced downwardly by means of spring fingers 38 to capture the wire ring 31 and the inner mouth 30 of the filter bag on the step of the larger ring 37, thereby holding the inner mouth of the filter bag securely in place. It should be noted that the spring fingers 38 have each of their ends attached to the cap 36 while the other end is secured to a flat plate 40 that is engaged by an undersurface 20a of the retainer plate 20.

It should be evident that the filter bag 16 is so constructed, with its cogs or flutings, that significantly more filter area is available than heretofore with filter bags for liquid flow of conventional design. The two concentric ring or neck portions provide an extended annular filter bag which is continuous from the outer to the inner ring.

Heretofore, there has been a problem with drainage of trapped liquid in a spent filter. Thus, when the filter was disposed of, often a considerable amount of liquid was thrown out together with the solid matter in the filter. As seen in FIGS. 1 and 2, a means has been devised to overcome this problem which takes the form of a solid slide plate 42 that extends vertically and blinds a section of the cogged filter. The slide is provided with a handle 44 which can be lifted to elevate the slide 42 and thereby uncover the formerly blinded section of the filter that remains clean so that the liquid in the spent filter can readily drain therefrom. Another structure (not shown) which can be utilized to facilitate drainage may take the form of a strip or flap of the bag filtering material that is adapted to uncover a clean filter area which will cause the rapid draining of the liquid downstream.

The slide 42, with the handle 44, may be used as a mechanical assistance to the proper seating of the filter bag media and may be secured to the underside of the retainer plate 20 so that the slide 42 will be automatically positioned when the retainer plate is in place to seal the pressure vessel.

Figure 6:
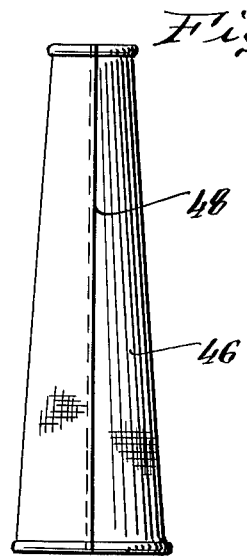
Figure 7:
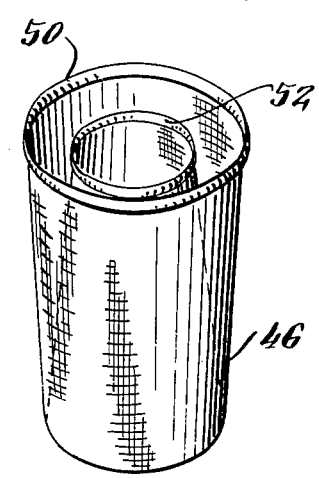
Figure 8:
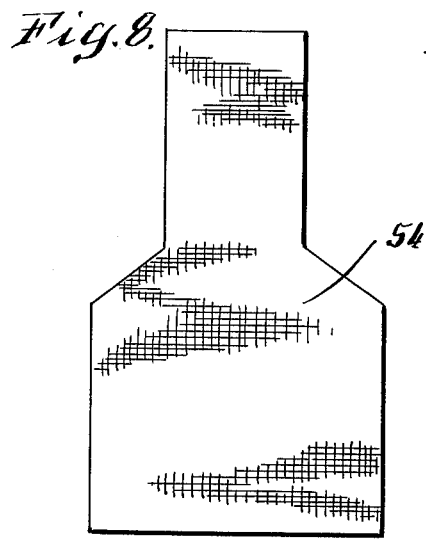
FIGS. 8, 9 and 10 show another method of making an annular filter bag in which the latter has a U—U configuration.
Figure 9:
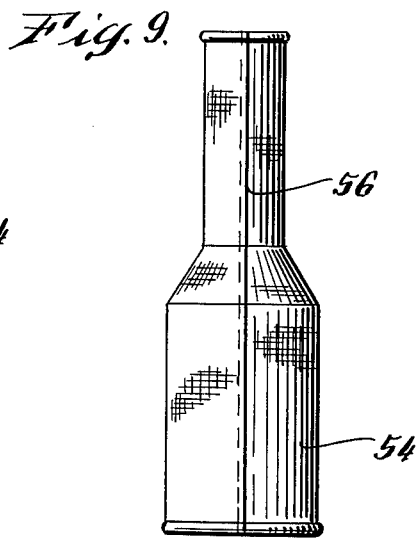
Figure 10:
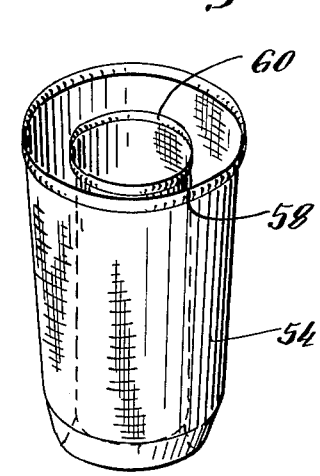
Figure 11:
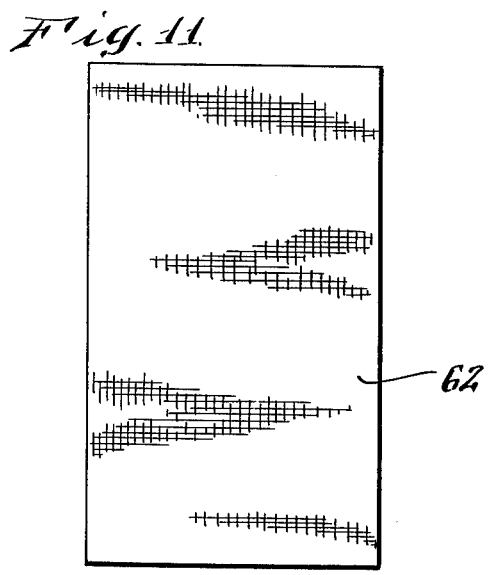
FIGS. 11, 12 and 13 show a further method of making an annular filter bag, which is the preferred method, and which results in a cogged configuration about the center feed pipe.
Figure 12:
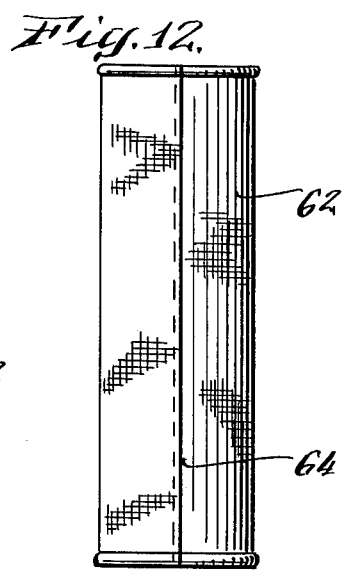
Figure 13:
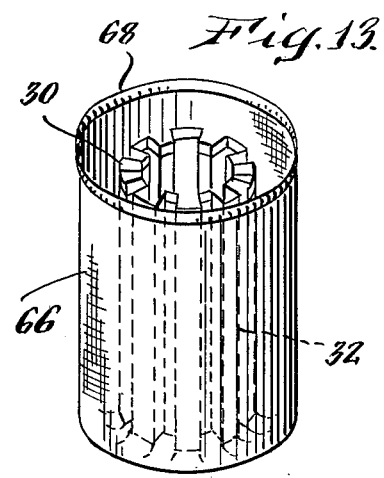

Several methods of making the annular-shaped filter bag 16 are shown in FIGS. 5-13 respectively. In FIGS. 5-7 a flat, trapezoidal-shaped filter media 46 is illustrated. The flat filter media is folded, as seen in FIG. 6, in a cone shape with the sides stitched or otherwise connected at 48. Then, the end portion of the filter material having the larger outer diameter ring 50 is drawn over the part of the filter having a smaller inner ring 52 to form an annular bag having a V—V shape in cross-section, which is continuous from the outer ring 50 to the inner ring 52. Since this annular filter bag has sloping sides it is possible to make the filter bag with straight walls and this is accomplished by the process shown in FIGS. 8-10 in which there is a filter media 54 which is folded and stitched at 56. Thereafter, the larger diameter rings 58 of the structure is drawn over the smaller diameter ring 60 to form an annular filter bag with two spaced straight walls into a U—U shape in cross-section. It should be apparent that many geometric configurations may be chosen in fabricating an annular filter bag which will extend the surface area of the filter media about a center inlet tube, however the preferred pattern is a cogged or fluted configuration, which appears to be the optimum in practical usefulness. A filter arrangement of the aforesaid type is illustrated in FIGS. 11-13 and as seen in FIG. 11 is initially a flat, rectangular-shaped form 62. The filter is folded and stitched along the line 64. In FIG. 13, the forming of a cogged or fluted arrangement about the center inlet pipe is shown which is achieved by means of a secondary operation employing gear wheels or a compression forming tool set. As an alternative, a reverse operation may be utilized in which a preformed member of spring steel, yieldable plastic, or like material, may be initially in a cogged form and which can be deformed or expanded to a circular configuration. Furthermore, the filter bag mouth material is stiffened to the desired form as explained hereinbefore. The bag is then drawn over to form an outer wall 66 having a larger diameter mouth 68. It is also within the scope of the present invention to provide a double-walled annular-shaped filter bag in which the space between the walls is occupied by a non-woven fibrous batt which results in a higher efficiency bag media. The retainer 18, which may be in the form of a wire mesh or perforated metal basket, functions as a rigid support to contain the filter bag 16 in order to permit the filter bag to be operative under higher pressure in which the filter bag itself could not be self-supporting.

Figure 14:
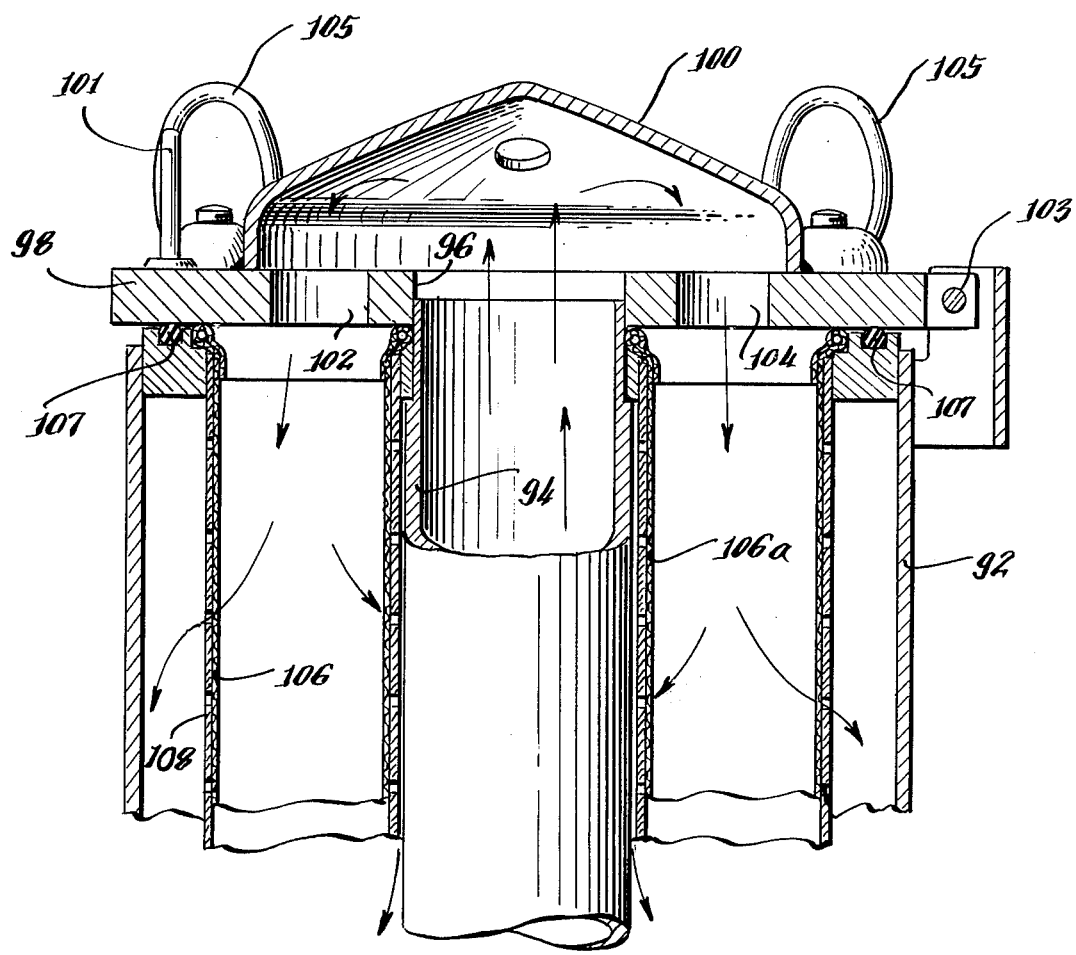
FIG. 14 is a partial sectional view of an alternate embodiment of the construction shown in FIG. 1.

FIG. 14 is a modification of the pressure vessel shown in FIG. 1 and illustrates a vessel 92 having a center feed conduit 94 which extends axially within the vessel 92 and has its upper end fitted within a through hole 96 in the retainer pressure plate 98. Secured to the top of the retainer plate 98 is a liquid-tight dome-shaped cover 100 that encloses a top area above the vessel which communicates with the center feed conduit 94. In addition, the retainer plate 98 is provided with holes 102 and 104 that permit the liquid flowing through the center feed conduit 94 to enter the dome-shaped cover 100 and pass through holes 102 and 104 into the annular shaped filter 106 having a cogged inner wall 106a. A perforated retainer 108 serves as a backup structure for the filter 106. The retainer pressure plate 98 is provided with a handle 101 which assists in lifting the plate 98 about the hinge pin 103. Hold-down bolts 105 are shown mounted on the plate 98 and which function to apply pressure to the plate forcing it against the sealing ring 107. The liquid, after passing through the filter 106, exists from the assembly by means of an outlet pipe (not shown) at the bottom of the pressure vessel.

Figure 15:
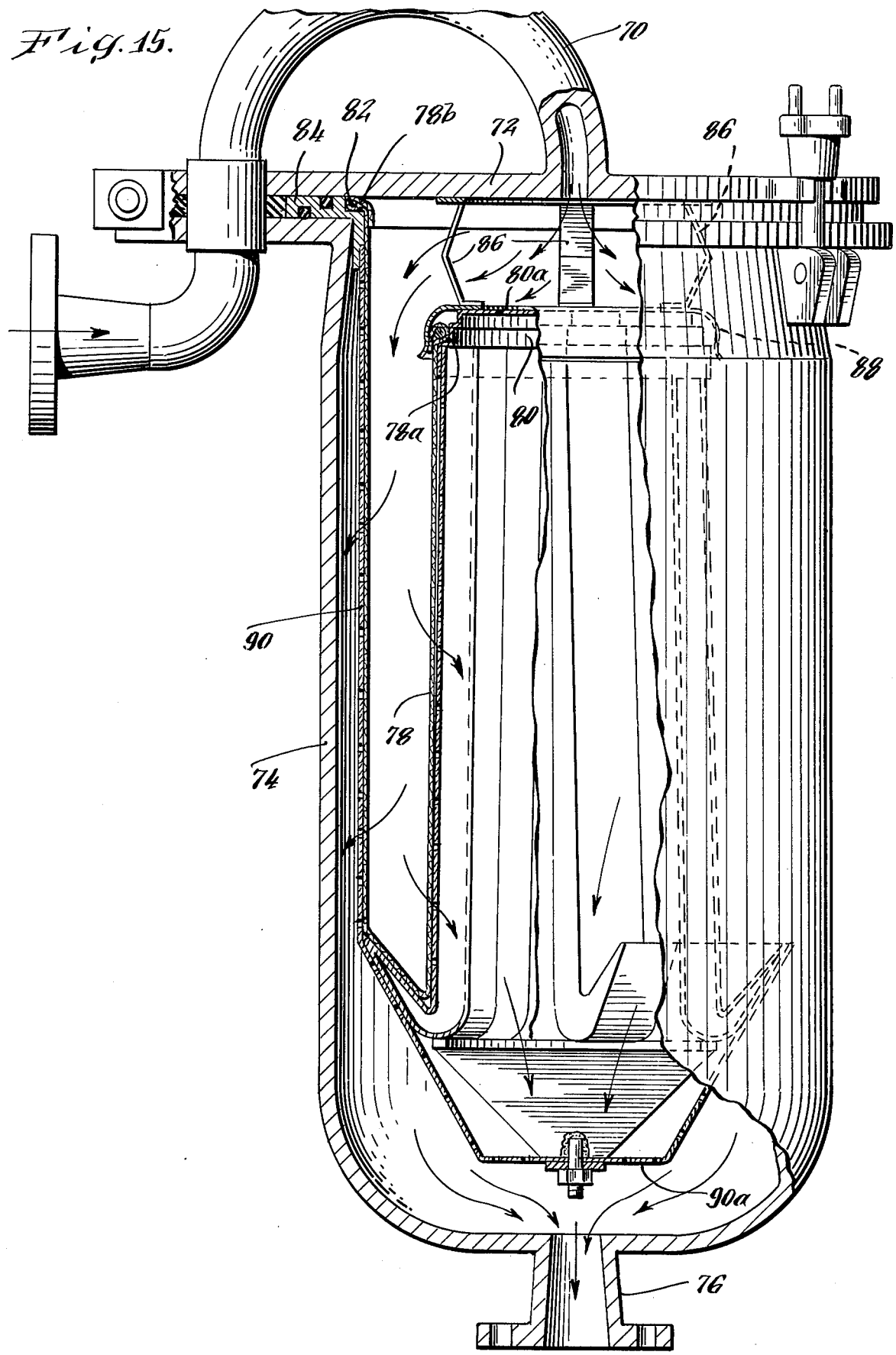
FIG. 15 is a side elevational view, partly in section, showing the present novel annular filter bag adapted to fit within a known pressure vessel.

Referring now to FIG. 15 in which the present annular filter bag is shown adapted to fit into existing filter bag retainers or perforated baskets of known pressure vessels. The employment of the present liquid filter bag in known structures increases the capacity or life of existing equipment. In the construction shown in FIG. 15 an inlet pipe 70 enters through the top plate 72 of the pressure vessel 74. The outlet pipe 76 for the filtered liquid is shown at the bottom of the vessel. The annular filter 78 has one end 78a fitted about the cogged element 80 while the other end 78b is secured on the annular seat 82 in the ring 84 and held in place by the top plate 72. The cogged element 80 is provided with a solid top surface 80a so that no liquid discharging from the inlet pipe 70 will pass through the element 80, but rather will be diverted around it into the space between the inner and outer walls of annular filter 78, as shown by the arrows. The spring 86 urges the retaining cap 88 against the circumference of the inner mouth of the filter 78. A back-up perforated basket 90 holds the outer wall of the filter 78 and has a flat bottom portion 90a which is spaced from the opening to the outlet 76. The path of liquid flow is from inlet pipe 70 through the double-walled filter 78 and out of the pressure vessel 74 through the outlet pipe 76. It should be obvious that the present annular filter bag can be incorporated in various types of liquid flow structures with a minimum of design revisions.

A further adaptation of the present arrangement is to the so-called open system in which the present annular filter bag can be positively attached. This is particularly desirable inasmuch as in the known systems, the filter can be dislodged since it depends upon the placement of a ring over a conical-shaped head and there is no method of positive affixation of the filter bag to the adaptor head. In order to use the present filter bag in an open system, a new adaptor head is structured to permit the bolting on a band for the positive gripping of the filter bag together with the strainer basket.

What is claimed is:

1. A liquid filtration system comprising in combination a pressure vessel having a liquid inlet pipe which enters said pressure vessel at the bottom thereof and has at least a portion thereof upstanding and centrally located, a liquid outlet pipe exiting from the bottom of said vessel and laterally removed from said liquid inlet pipe, a double-walled annular liquid filter bag having necks of different diameters, a fitting mounted over the upper end of said inlet pipe and retaining the neck portion of the inner wall of said annular filter bag, a ring means at the top of said pressure vessel, said ring means retaining the neck portion of the outside wall of said filter at a spaced location relative to said inner wall, and a top plate having means for applying pressure thereto in order to seal said pressure vessel, the liquid flow being from said inlet pipe through said double-walled annular filter and exiting through said liquid outlet pipe.

2. A filter bag as claimed in claim 1 wherein said annular bag has a V—V cross-section.

3. A filter bag as claimed in claim 1 wherein said annular bag has a U—U cross-section.

4. A liquid filtration system as claimed in claim 1 wherein said fitting is cog-shaped thereby causing said inner wall of the filter bag to be rendered cog-shaped in cross-section.

5. A liquid filtration system as claimed in claim 1 wherein said upper end of the inlet tube is spaced below the plane of said top plate, and resilient means having one end engaging the bottom surface of said top plate and the other end thereof pressing against said fitting to securely retain said filter bag in position in said pressure vessel.

6. A liquid filtration system as claimed in claim 1 wherein said top plate is provided with a plurality of apertures therethrough, said centrally located inlet pipe extending into communication with one of said apertures, and further comprising a dome-shaped cover over said top plate and forming a chamber therewith whereby liquid flows through said inlet pipe into said chamber and out of at least one of said other apertures into said annular liquid filter bag.

7. A liquid filtration system as claimed in claim 1 further comprising a detachable element which covers a selected part of said filter bag during the flow of the liquid through said double-walled annular filter, and can be removed when it is desired to dispose of said filter in order to expose a clean area of said filter for ease in the drainage of liquid therefrom.

8. A liquid filtration system as claimed in claim 4 further comprising a detachable element which covers a selected part of the cog-shaped inner wall of said filter bag during the flow of the liquid through said double-walled annular filter, and can be removed when it is desired to dispose of said filter to expose a clean area of said filter for ease in the drainage of liquid therefrom.

9. A liquid filtration system comprising in combination a pressure vessel having a liquid inlet pipe, a liquid outlet pipe in said vessel, an annular porous retainer member, a double-walled annular liquid filter bag having necks of different diameters, a fitting mounted over the neck having a smaller diameter and secured to the adjacent periphery of said retainer member, a ring means at the top of said pressure vessel, said ring means retaining the neck of a larger diameter, said filter bag being suspended within said retainer member, a closed plate surrounding said fitting, a top plate for said pressure vessel having means for applying pressure thereto in order to seal said pressure vessel, and resilient means operative between said top plate and closed plate to urge the latter against said fitting to securely retain said filter bag in position in said pressure vessel.

* * * * *